Figures 1, 1A:
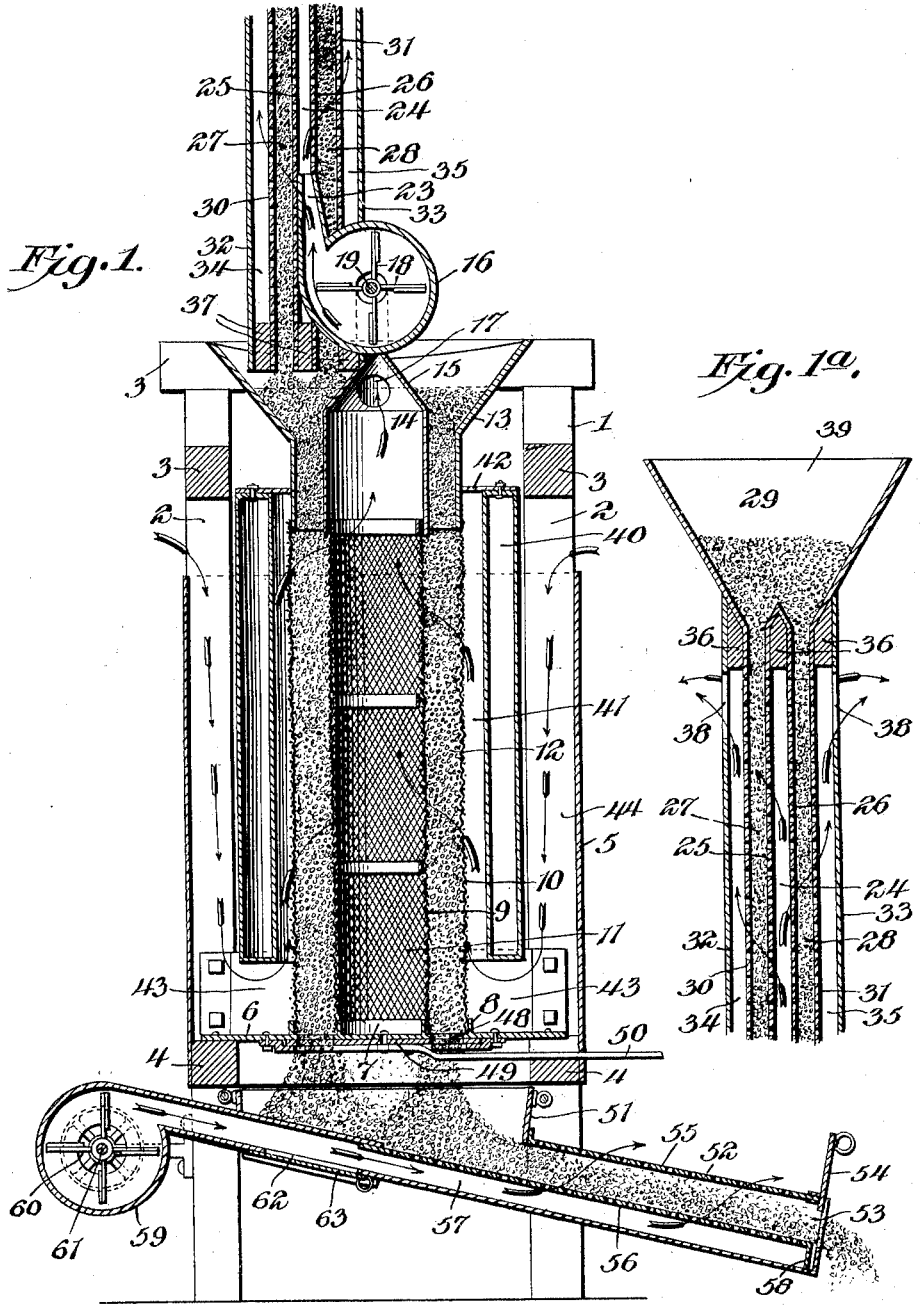

No. 759,527. PATENTED MAY 10, 1904.
J. W. IRWIN.
GRAIN DRIER AND COOLER.
APPLICATION FILED NOV. 1, 1902.
NO MODEL. 2 SHEETS—SHEET 1.

John Willard Irwin, Inventor,

By C. G. Siggers

Witnesses
Attorney

No. 759,527. PATENTED MAY 10, 1904.
J. W. IRWIN.
GRAIN DRIER AND COOLER.
APPLICATION FILED NOV. 1, 1902.
NO MODEL. 2 SHEETS—SHEET 2.
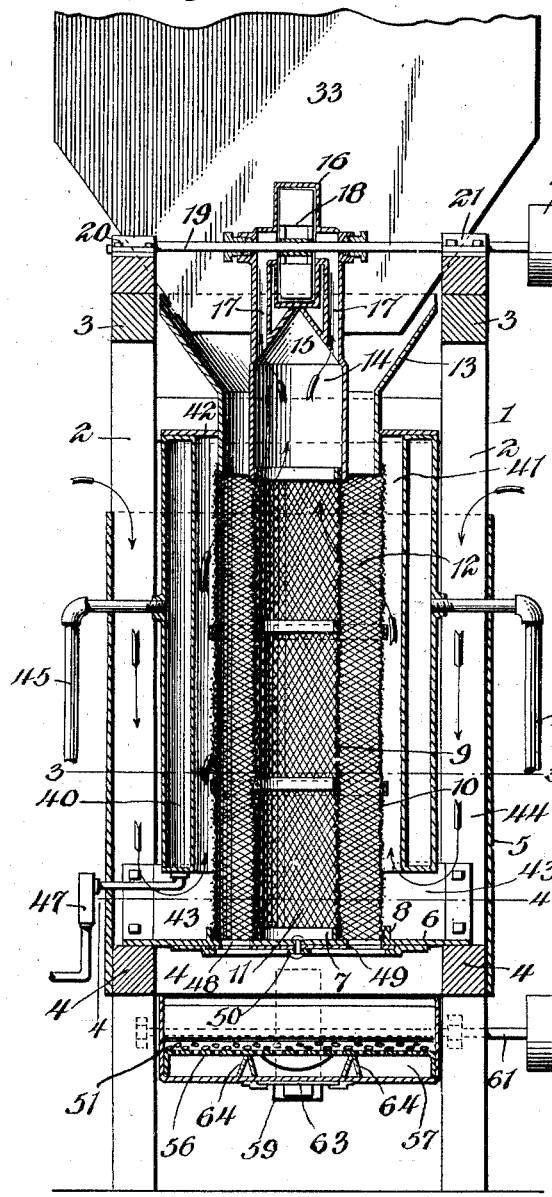
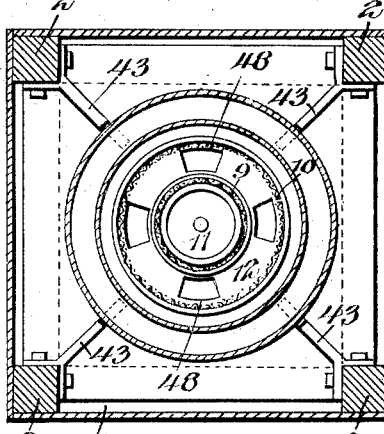
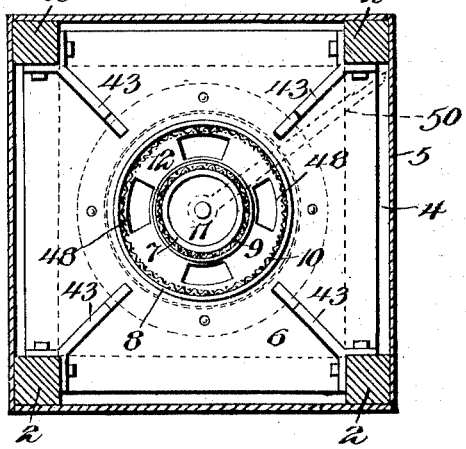
John Wilbard Irwin, Inventor,
Witnesses No. 759,527. Patented May 10, 1904.

UNITED STATES PATENT OFFICE.

JOHN WILLARD IRWIN, OF EMERSON, CANADA.

GRAIN DRIER AND COOLER.

SPECIFICATION forming part of Letters Patent No. 759,527, dated May 10, 1904.

Application filed November 1, 1902. Serial No. 129,777. (No model.)

*To all whom it may concern:*

Be it known that I, JOHN WILLARD IRWIN, a citizen of the United States, residing at Emerson, in the Province of Manitoba, Canada, have invented a new and useful Grain Drier and Cooler, of which the following is a specification.

This invention relates to a novel apparatus for drying and cooling grain, and has for its object to produce a simple and efficient device for economically and rapidly drying damp grain and for cooling grain that has become heated either by sweating in storage or during the drying of the grain through the medium of a blast of hot air.

To the accomplishment of this object, the invention comprehends in its preferred embodiment an apparatus including means for passing and repassing a current of hot air through a moving body of grain to dry the same, and separate means for passing a blast of cold air through the grain to cool the latter after it has been thoroughly dried.

The invention also resides in certain features of construction and arrangement, which will be hereinafter fully described, illustrated in the accompanying drawings, and defined in the appended claims.

In said drawings, Figure 1 is a vertical sectional view through the apparatus with the feed-hopper and a portion of the adjacent structure removed. Fig. 1ª is a sectional view of that portion of the apparatus omitted in Fig. 1. Fig. 2 is a vertical sectional view of the subject-matter of Fig. 1, the line of section being taken at right angles to the line of section of said figure. Fig. 3 is a horizontal sectional view on the line 3 3 of Fig. 1, and Fig. 4 is a similar view on the line 4 4 of Fig. 1.

Like numerals of reference are employed to designate corresponding parts throughout the several views.

The frame 1, which supports the apparatus, comprises a series of uprights 2, connected by upper and lower transverse beams 3 and 4. For a portion of its length this frame is inclosed by a casing 5, extending from the beams 4 to a point considerably above the same. Upon the lower beams 4 is supported what may be termed a "base-plate" 6, formed with upstanding annular flanges 7 and 8 for the attachment of the lower ends of inner and outer concentric cylinders 9 and 10 of stout wire-netting or other open-work material, defining a central air-chamber 11 and a surrounding grain-passage 12 of annular form.

The upper end of the cylinder 10 is connected to the bottom of a receiving-hopper 13, within which is disposed a concentric dome 14, secured to the upper end of the inner cylinder 9, and having a conical top 15, surmounted by a fan-casing 16. Communication between the interior of the fan-casing and the central air-chamber 11 is established by means of a pair of inlet-tubes 17, extending upwardly from the dome 14 and opening into the side of the casing. Within the casing 16 is mounted a fan 18. A shaft 19 is afforded bearings 20 and 21 at the outer sides of the tubes 17 and on two of the upper beams 3 and is provided upon one end with a power-pulley 22 for the application of power to drive the fan.

The rotation of the fan 18 within the casing will cause air to be drawn up from the central chamber 11, egress to which is closed except through the open-work walls thereof, and from the casing the air is supplied through a spout 23 to a vertically-disposed air-passage 24, defined between the adjacent foraminous walls 25 and 26 of a pair of grain-passages 27 and 28, opening at their upper ends into the bottom of a feed-hopper 29, into which the damp grain is placed initially and from which it passes through the apparatus. The grain-passages 27 and 28, leading from the feed-hopper, are defined between the inner foraminous walls 25 and 26 and foraminous outer walls 30 and 31, beyond which are the imperforate side walls 32 and 33, defining outer air-chambers 34 and 35 beyond the grain-passages. It is intended that air forced into the central passage 24 shall pass laterally through the grain-passages and into the outer air-passages 34 and 35, escaping thence at points below the feed-hopper 29. To compel this character of circulation, the upper and lower ends of the several air-passages 24, 34, and 35 are closed by bars 36 and 37, which also serve to space the several walls or partitions, and adjacent to the upper ends of the outer chambers the walls 32 and 33 are provided with outlet-openings 38, through which the air escapes after passing through the two grain-passages at opposite sides of the central air-passage. The sides of the hopper 29 and of the several passages disposed below the same are closed by walls 39, which serve to stiffen the structure and to prevent the air from escaping at any point other than the outlet-openings 38. The lower ends of the grain-passages 27 and 28 being open, grain deposited in the hopper 29 will gravitate through said passages and into the receiving-hopper 13 and the annular grain-passage therebelow.

From the foregoing description of the apparatus it will appear that the fan 18 when in operation will draw air through the body of grain in the annular grain-passage and into the central air-chamber 11, from whence the air will be forced into the central passage 24 and through the grain in the passages 27 and 28.

For the purpose of heating the air prior to its passage through the grain I employ a heater having the form of an annular steam-chamber 40, surrounding the major portion of the annular grain-passage 12, but spaced from the outer wall thereof to define an annular air-passage 41, open at its bottom, but having its top closed by an annulus 42, preferably secured to the upper end of the heater. The steam-chamber 40 is supported at some distance above the base-plate 6 by brackets 43, which are preferably vertically-disposed plates bolted to the frame-uprights 2 and extended inwardly to support the heater, as shown in Figs. 2 and 3. The elevation of the heater provides a space through which air may circulate to the air-chamber 41 from an outer air-chamber 44, defined between the casing 5 and the outer wall of the heater and having its upper end open, as shown in Fig. 1. As indicated in said figure, the air enters the outer air-chamber 44 at its upper end and passes thence along the outer wall of the heater and around its lower end to what may be termed the "intermediate" air-chamber 41, from whence it circulates, as already described, through the body of grain in the chamber 12, the central air-chamber 11, the fan-casing 16, and the central air-passage 24, and thence through the grain in the grain-passages 27 and 28 to the outer air-passages 34 and 35, from whence it escapes through the outlet-openings 38 adjacent to the feed-hopper. This arrangement compels the air to circulate around the heater and provides an economical method of raising the temperature of the air to a proper point before its circulation through the body of grain.

The means employed for supplying the heater 40 with a heating agent may of course be varied within wide limits, but by preference steam-pipes 45 and 46, leading from a suitable source of supply, are passed through the casing 5 and tapped into the outer wall of the steam-chamber to provide a constant circulation of steam through the latter. If steam is utilized as a heating agent, as is contemplated in the present embodiment of the invention, a trap 47 is connected to the bottom of the chamber to provide for the escape of the water of condensation.

While it is not absolutely essential that the drying of the grain be effected while the grain is in motion, it can be effected most economically by permitting the grain to pass in a continuous stream through the apparatus, as the quantity of grain treated in a given time is thus increased, and less power is required to induce a circulation of air therethrough. The grain is therefore designed to gravitate through one or a series of openings 48, located in the base-plate 6 between the upstanding flanges 7 and 8, the flow of grain being regulated by the adjustment of a rotary valve 49, secured to the under side of the base-plate and designed to be operated by a lever 50, secured to the valve and extended beyond the casing, as shown in Fig. 1, for convenient manipulation.

So far as the mere drying of the grain is concerned the apparatus constructed as thus far described would perhaps be effective; but as the storage of heated grain is impractical, and, furthermore, as the device is designed to be utilized for the cooling of grain which has become heated in storage, I prefer to combine with the described mechanism a simple arrangement for passing a current of cool air through the grain received from the grain-passage 12. For this purpose I mount within the frame 1, at a point below the base-plate 6, a shallow hopper 51, from which extends a discharge-chute 52, the discharge-opening 53 of which is controlled by a gate-valve 54. The top wall 55 of the discharge-chute 52 is foraminous, and the inclined bottom wall 56 common to the hopper and chute is likewise foraminous for a considerable portion of its length and constitutes the top wall of a cold-air passage 57, closed at its lower end by a wall 58 and communicating at its upper end with a fan-casing 59. Within the casing 59 is mounted to rotate a fan or blower 60, carried by a shaft 61, driven in any suitable manner and designed to induce a circulation of cold air through the air-passage 57 and up through the grain within the discharge-chute 52, the open formation of the walls 55 and 56 providing for the circulation of cold air in the manner indicated. An opening 62 in the bottom wall of the cold-air passage 57 is closed by a sliding valve 63. At such points as may be required the various spaced partitions are braced by intermediate spacers 64, constructed, for instance, as shown in Fig. 2, between the top and bottom walls of the cold-air passage.

Briefly the operation of the grain drying and cooling apparatus described is as follows: The grain supplied to the feed-hopper 29 will gravitate in a downwardly-moving stream through the grain-passages 27 and 28, the receiving-hopper 13, the annular grain-passage 12, the hopper 51, and the discharge chute or passage 52. This downwardly-moving stream of grain will be subjected to the drying action of a current of air circulating in the opposite direction and passing and repassing through the stream of material, the first passage being effected at an advanced point of the stream, and the repassage being effected somewhat nearer the initiation of the stream— that is to say, the grain is primarily heated or subjected first to the action of a current of air which has already been passed through the stream of grain at an advanced point, so that the initial or primary heating and drying of the grain is effected by the utilization of a current of hot air which has been utilized primarily to effect the secondary heating and drying of the body of grain. Having thus been effectually dried, the heated grain will gravitate to the hopper 51 and through the discharge-chute 52, and during its passage through the latter will be effectually cooled by the passage therethrough of a current of cold air induced by the fan or blower 60. It will of course be evident that while the apparatus has been described with special reference to the drying and cooling of grain, it may be employed with equal facility in connection with various other materials, the provision of the valves 49 and 54 permitting the movement of the material to be regulated in accordance with the quantity of moisture to be evaporated during the passage of said material through the apparatus.

Attention is directed to the fact that while in the specific aspect of the invention it comprehends a grain-passage 12, to which other passages 27 and 28 deliver the grain, a broader aspect of the invention comprehends a single grain-passage formed by the passage 12, the hopper 13, and either of the passages 27 and 28 for a continuous stream of grain through which air is drawn laterally in one direction from the neighborhood of the heater, and through which the same body of air is projected in the opposite direction and at a separated point.

It is thought that from the foregoing the construction and operation of my grain drier and cooler will be clearly apparent; but while the illustrated embodiment of the invention is believed at this time to be preferable, I do not wish to limit myself to the structural details defined, as, on the contrary, I reserve the right to effect such changes, modifications, and variations of the illustrated structure as may be fairly embraced within the scope of the protection prayed.

What I claim is—

1. In a grain-drier, the combination with an annular grain-passage surrounding an interior air-chamber and having pervious walls and a heater beyond the outer wall of the grain-passage, of a suction device communicating with the interior air-chamber to induce a circulation of air through the grain-passage from the neighborhood of the heater.

2. In a grain-drier, the combination with an annular grain-passage defined by pervious walls and inclosing an interior air-chamber, of a heater surrounding a portion of the annular grain-passage and spaced therefrom, and a suction device communicating with the interior air-chamber to induce a circulation through the grain-passage from the neighborhood of the heater.

3. In a grain-drier, the combination with a grain-passage inclosing an interior air-chamber, of a heater surrounding a portion of the grain-passage and spaced therefrom, a casing surrounding the heater to define an outer air-passage open at its upper end and communicating at its lower end with the intermediate air-passage defined between the heater and the grain-passage, and a suction device communicating with the interior air-chamber for inducing a circulation around the heater and through the grain-passage.

4. In a grain-drier, the combination with an annular grain-passage surrounding an interior air-chamber and having a receiving-hopper at its upper end, of a grain-passage arranged to deliver grain to the hopper and having pervious walls, an air-passage separated from the grain-passage by one of said walls, a fan-casing communicating with both the interior air-chamber and the air-passage, and a rotary fan within the casing.

5. In a grain-drier, the combination with an annular grain-passage having pervious walls, of a receiving-hopper at the upper end of said passage, a pair of grain-passages disposed to deliver grain to the hopper and having pervious walls, said grain-passages being separated to define an intermediate air-passage, a fan-casing communicating at one side thereof with the air-chamber and having its spout extended into the air-passage between the spaced grain-passages, and a fan within the casing.

6. In a grain-drier, the combination with a grain-passage surrounding an interior air-chamber and having a receiving-hopper at its upper end, of a feed-hopper, grain-passages leading from the feed-hopper to the receiving-hopper and having pervious walls, said grain-passages being spaced apart to define an intermediate air-passage, outer walls spaced from the outer sides of the grain-passages to define outer air-passages, said walls being provided with openings adjacent to their upper ends, a fan-casing communicating at its side with the interior air-chamber surrounded by the first-named grain-passage, and having its spout extended into the air-passage intermediate of the grain-passages leading from the feed-hopper, and a fan within the casing.

7. In a grain-drier, the combination with a grain-passage surrounding an interior air-chamber and having a receiving-hopper at its upper end, of a feed-hopper, grain-passages leading from the feed-hopper to the receiving-hopper and having pervious walls, said grain-passages being spaced apart to define an intermediate air-passage, outer walls spaced from the outer sides of the grain-passage to define outer air-passages, said walls being provided with openings adjacent to their upper ends, a fan-casing communicating at its side with the interior air-chamber surrounded by the first-named grain-passage, and having its spout extended into the air-passage intermediate of the grain-passages leading from the feed-hopper, a fan within the casing, and a heater surrounding the grain-passage below the receiving-hopper.

8. In a grain drier and cooler, the combination with a grain-passage, and means for inducing a circulation and recirculation of hot air therethrough at separated points, of a discharge-chute disposed to receive grain from the grain-passage, and means for inducing a circulation of cold air through the discharge-chute.

9. In a grain drier and cooler, the combidation with an annular grain-passage having pervious walls surrounding an interior air-chamber, a heater surrounding said grain-passage, and a suction device communicating with the air-chamber to induce a circulation through the grain-passage from the neighborhood of the heater, of a discharge-chute arranged to receive grain from the grain-passage and having pervious top and bottom walls, a cold-air passage closed at one side by one of the walls of the discharge-chute, and a fan for inducing a circulation of cold air through the cold-air passage and the discharge-chute.

10. In a grain drier and cooler, the combination with an annular grain-passage surrounding an interior air-chamber and having pervious walls, of a heater surrounding the grain-passage, a suction device communicating with the interior air-chamber to induce a circulation of air through the grain-passage from the neighborhood of the heater, a valve controlling the escape of the grain from the lower end of the grain-passage, a hopper disposed below the valve, a discharge-chute leading from the hopper and having pervious top and bottom walls, a cold-air passage disposed below the discharge-chute, a fan-casing communicating with one end of said passage, means for closing the opposite end of the passage, and a fan within the fan-casing.

11. In a grain drier and cooler, the combination with an annular grain-passage having pervious walls and surrounding an interior air-chamber, of a heater encircling the grain-passage, and a suction device located at the upper end of the interior air-chamber to exhaust the air from said chamber and thus induce a circulation through the grain-passage from the neighborhood of the surrounding heater.

12. In a grain-drier, the combination with an annular grain-passage having pervious walls and surrounding an interior air-chamber, of a hopper at the upper end of the passage, a second grain-passage leading to the hopper, and means for exhausting the air from the interior air-chamber and for projecting said air through the second grain-passage leading to the hopper.

13. In a grain drier and cooler, the combination with a grain-passage, of means for inducing a circulation and recirculation of air therethrough, a hopper located below the grain-passage to receive the grain therefrom, a discharge-chute leading from the hopper, and means for inducing a circulation of air through the chute.

14. In a grain-drier, the combination with a grain-passage having pervious walls, of a pair of grain-passages arranged to deliver grain to the first-named passage and separated by an intermediate air-passage, a heater, and means for drawing air through the first-named grain-passage from the neighborhood of the heater, and for projecting the same body of air into the air-passage.

15. In a grain-drier, the combination with a grain-passage surrounding an interior air-chamber, of a pair of grain-passages disposed to deliver grain to the first-named grain-passage and having pervious walls and an intermediate air-passage, and means for drawing air from the interior air-chamber and for projecting said air into the air-passage.

16. In a grain-drier, the combination with a grain-passage inclosing an interior air-chamber and having pervious walls, of an exterior heater and means for exhausting air from the interior air-chamber to induce a lateral circulation of air through the grain-passage from the neighborhood of the heater.

17. In a grain-drier, the combination with pervious means for confining and directing a continuous stream of grain, of a heater surrounding said means at one point and spaced therefrom, and a combined suction device and blower arranged to draw air laterally through the stream of grain from the neighborhood of the heater and to forcibly project the same body of air through the stream in the opposite direction at a point nearer the initiation of said stream.

In testimony that I claim the foregoing as my own I have hereto affixed my signature in the presence of two witnesses.

JOHN WILLARD IRWIN.

Witnesses:
D. McArthur,
M. Rupert Wearl.